United States Patent
Hagiwara et al.

(10) Patent No.: US 6,944,428 B2
(45) Date of Patent: Sep. 13, 2005

(54) IMAGE INFORMATION INPUT/OUTPUT DEVICE AND CONTROL SYSTEM FOR THE SAME USING MOBILE DEVICE

(75) Inventors: Takahiro Hagiwara, Chiba (JP); Yasushi Ohwa, Machida (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 824 days.

(21) Appl. No.: 09/921,702

(22) Filed: Aug. 6, 2001

(65) Prior Publication Data

US 2003/0027528 A1 Feb. 6, 2003

(51) Int. Cl.$^7$ .................... H04B 7/00; H04B 7/185; G06F 15/00
(52) U.S. Cl. .................. 455/66.1; 342/357.09; 358/1.14
(58) Field of Search .................... 455/66.1, 67.11, 455/456.1–456.3; 358/1.13–1.15; 342/357.08–357.1; 701/215, 300; 702/150; 713/189, 200

(56) References Cited

U.S. PATENT DOCUMENTS

| 6,493,649 | B1 * | 12/2002 | Jones et al. | ........... 702/150 |
| 6,711,677 | B1 * | 3/2004 | Wiegley | ............... 713/151 |
| 6,806,976 | B1 * | 10/2004 | Suyehira | .............. 358/1.14 |
| 2002/0059450 | A1 * | 5/2002 | Masaki | ................. 709/238 |

FOREIGN PATENT DOCUMENTS

| JP | 6-233046 A | 8/1994 |
| JP | 11-194901 | 7/1999 |
| JP | 11-338317 A | 12/1999 |
| JP | 2001-86275 A | 3/2001 |

\* cited by examiner

Primary Examiner—Benny Tieu
(74) Attorney, Agent, or Firm—Foley & Lardner LLP

(57) ABSTRACT

A radio communication module accommodated in an image information input/output device capable of carrying out communication by varying a send output power to a plurality of mobile radio terminals located away from the image information input/output device through arbitrary distances respectively. A distance calculation module calculates a distance of each of the mobile radio terminals from a send-output power value of the radio communication module which is making communication with each of the mobile radio terminal. A mobile radio terminal control module manages identification information and user information specifying each the mobile radio terminal, and the distances and time calculated by the distance calculation module. An interval timer periodically makes communication with each the mobile radio terminal and calculates the distance. Whenever the communication with each the mobile radio terminal is made, a user judging module detects that any of the users approached the image information input/output device based on the distance calculated by the distance calculation module, and specifies a user based on the identification information which specifies each of the mobile radio terminals in the plurality of mobile radio terminals which are managed by the mobile radio terminal control module.

10 Claims, 14 Drawing Sheets

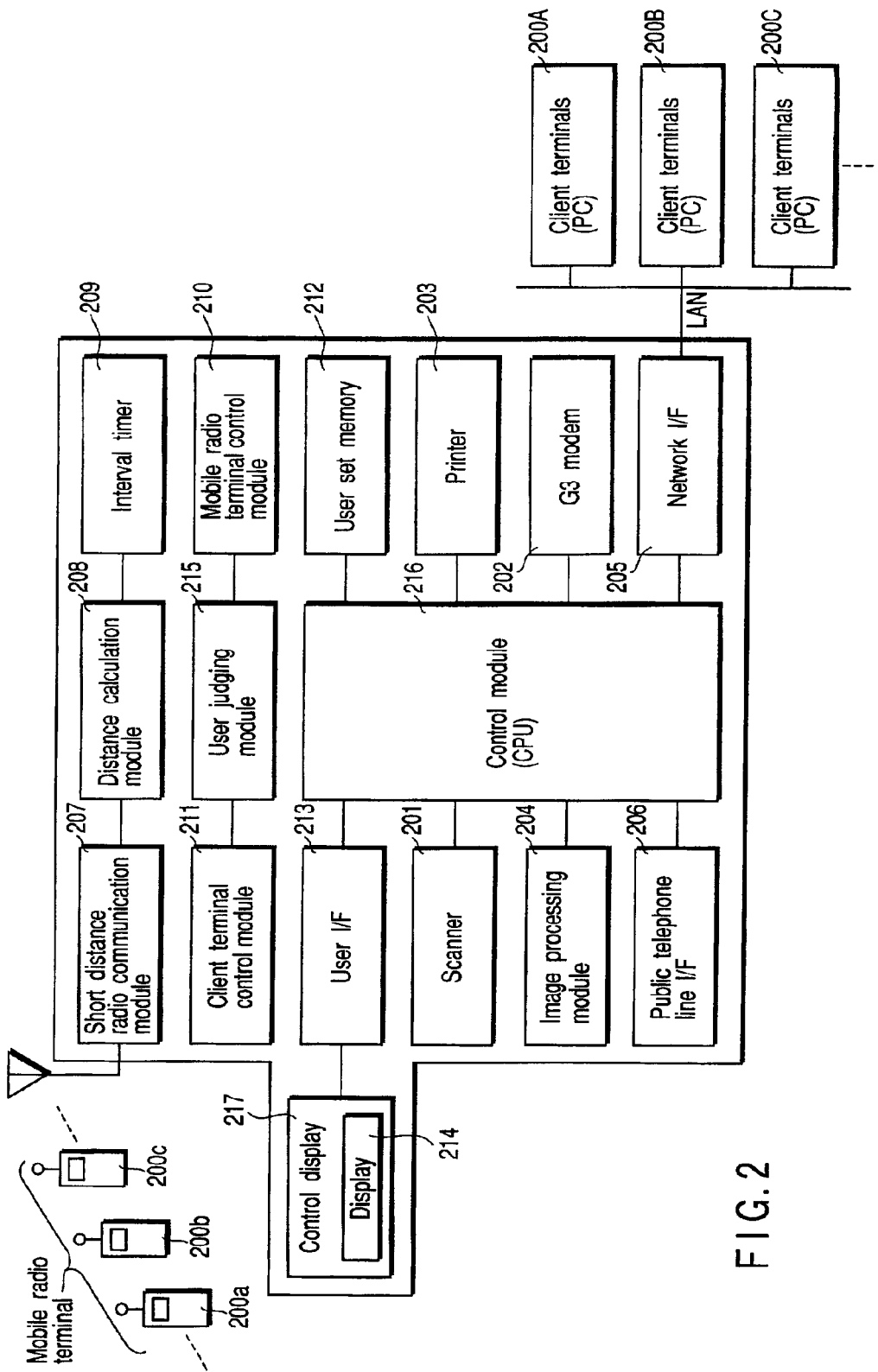
F I G. 2

| Mobile telephone control section | | | | | | | |
|---|---|---|---|---|---|---|---|
| Mobile identification information | User's name | Telephone number | Time 1 | Distance 1 | | Time n | Distance n |
| | | | | | | | |

FIG. 5

| Client terminal control section | | | |
|---|---|---|---|
| Client identification information | User's name | Short distance radio (presence or adsence) | Kind of terminal |
| | | | |

FIG. 6

| When job is received \ After completion of job | Distance B0 ≠ minimum value, Distance B1, distance an are arbitrary | Distance B0 ≠ minimum value, Distance B1 = minimum value, Distance Bn ≠ minimum value | Distance B0 ≠ minimum value, Distance B1 ≠ minimum value, Distance Bn = minimum value | All of distance B0, B1, Bn are out of measuring range |
|---|---|---|---|---|
| Distance A0 = minimum value, Distance A1, distance an are arbitrary | Print procedure: completed<br>Output original draft: received<br>Notification destination: terminal requesting print<br>Method: display "print was completed" on display | Notification destination: terminal 1<br>Number of notification and method:<br>① Display "print was completed" on display<br>② Display "request print reception" on display<br>③ Warning sound + display "print was completed" | Print procedure: not completed<br>Output original draft: received<br>Notification destination: terminal n<br>Number of notification and method:<br>① Display "print was completed" on display<br>② Display "request print reception" on display<br>③ Warning sound + display "print was completed" | Notification destination: place notification on hold until print is detected, or Mobile radio terminal<br>Method: when notification is sent, send "print was completed" by sound mail using public telephone line |
| Distance A0 ≠ minimum value, Distance A1, distance an are arbitrary | Print procedure: completed<br>Output original draft: received<br>Notification destination: none<br>Method: notification is not sent | | Print procedure: not completed<br>Output original draft: received<br>Notification destination: mobile radio terminal<br>Number of notification and method:<br>① Send message "print was completed"<br>② Send message "request print reception"<br>③ Warning sound + send "print was completed" | |

FIG. 11

| When job is received \ After completion of job | Distance B0 ≠minimum value Distance B1, distance an are arbitrary | Distance B0 =minimum value Distance B1 =minimum value Distance Bn ≠minimum value | Distance B0 ≠minimum value Distance B1 =minimum value Distance Bn =minimum value | Distance B0 ≠minimum value Distance B1 ≠minimum value Distance Bn =minimum value | All of distance B0, B1, Bn are out of measuring range |
|---|---|---|---|---|---|
| Distance A0 =minimum value Distance A1, distance an are arbitrary | Print procedure: completed Outpur original draft: received Notification destination: terminal requesting print Method: display "print was completed" on display | Print procedure: not completed Output original draft: received Notification destination: terminal 1 Number of notification and method: ① Display "print was completed" on display ② Display "request print reception" on display ③ Warning sound +display "print was completed" | Print procedure: not completed Output original draft: received Notification destination: terminal 2 Number of notification and method: ① Display "print was completed" on display ② Display "request print reception" on display ③ Warning sound +display "print was completed" | Print procedure: not completed Output original draft: received Notification destination: mobile radio terminal Number of notification and method: ① Send message "print was completed" ② Send message "request print reception" ③ Warning sound +send "print was completed" | Print procedure: not completed Output original draft: not received Notification destination: notification is placed on hold until mobile terminal is detected Method: notification is not sent |
| Distance A0 ≠minimum value Distance A1, distance an are arbitrary | Print procedure: completed Outpur original draft: received Notification destination: none Method: notification is not sent | | | | |

FIG. 12

| Print request managing table | | | | | |
|---|---|---|---|---|---|
| Print order | Client identification information | User's name | Print data storing place | Received time | Notification history |
| | | | | | |

FIG. 13

IMAGE INFORMATION INPUT/OUTPUT DEVICE AND CONTROL SYSTEM FOR THE SAME USING MOBILE DEVICE

BACKGROUND OF THE INVENTION

1. Field of the Invention

The present invention relates to an image information input/output device and a control system for controlling the image information input/output device using a mobile device. More particularly, the invention relates to a compound image information input/output device having a copy function, a scanner function, a printer function, a facsimile function, a network communication function and the like, and the invention relates to a control system for controlling the image information input/output device using a mobile device 2. Description of the Related Art Conventionally, there are known an image information input/output device and its control system in which in the image forming device as the above-described image information input/output device for executing a reading input or a print output of image information, if printing is requested for example, or when failure is generated during the print processing, a sender is informed of the fact that the failure was generated through a network, or a relative distance between a client terminal and the image forming device is previously registered, and when the failure is generated, the client terminal having short distance is informed of the failure through the network for restoration of the failure, or a customer engineer is directly informed of the failure depending upon a degree of the failure.

However, such conventional image information input/output device and its control system have a system in which the relative distances between the client terminals and the image forming device are previously registered, and when a failure was generated, the client terminal having short distance is informed of the failure through the network. Therefore, the notification destination is a fixed client terminal, and a person is not always in front of the fixed client terminal, and this notification method is not efficient.

Further, in the conventional image information input/output device and its control system, when the relative distances between the client terminals and the image forming device are previously registered, and when a failure was generated, the client terminal having short distance is informed of the failure through the network, a notification of failure is sent to a user who did not request the printing only because the distance is short, and this notification method leaves much to be desired.

Further, in the conventional image information input/output device and its control system, when the relative distances between the client terminals and the image forming device are previously registered, and when a failure was generated, the client terminal having short distance is informed of the failure through the network. Therefore, there is inconvenience that a distance between the image forming device and a user who is moving is neglected, effective service for intentional processing of a user who approached the image forming device is not provided for that user beforehand from the image forming device.

BRIEF SUMMARY OF THE INVENTION

It is an object of the present invention to provide an image information input/output device in which a distance from a user who is moving is not neglected, and effective service is given to a user who approached beforehand, and to provide a control system for the image information input/output device using a mobile device in which a notification of failure when a failure is generated in the image information input/output device is efficiently sent so that the notification of failure which does not leave much to be desired for the user can be realized.

To achieve the above object, according to the present invention, the followings are provided.

(1) An image information input/output device for executing reading input or printing output of image information comprising:

a radio communication module capable of carrying out communication by varying a send-output power to a plurality of mobile radio terminals located away from the image information input/output device through arbitrary distances respectively, a distance calculation module which calculates a distance of each of the mobile radio terminals in the plurality of mobile radio terminals from a send-output power value of the radio communication module which is carrying out communication with each of the mobile radio terminals of the a plurality of mobile radio terminals, a mobile radio terminal control module which manages identification information and user information for identify the mobile radio terminals in at least the plurality of mobile radio terminals, and distance and time calculated by the distance calculation module, an interval timer which allows the radio communication module to periodically carry out communication with the mobile radio terminals in the a plurality of mobile radio terminals, and allows the distance calculation module to periodically calculate the distance, and a user judging module which detects that any of the plurality of users approached the image information input/output device based on the distance calculated by the distance calculation module, and which identifies a user who approached the image information input/output device based on identification information which identifies each of the mobile radio terminals of the plurality of mobile radio terminals managed by the mobile radio terminal control module, whenever communication with each of the mobile radio terminals of the plurality of mobile radio terminals is carried out by the radio communication module by the interval timer.

(2) An image information input/output device for executing reading input or printing output of image information comprising:

a radio communication module capable of carrying out communication by varying a send-output power to a plurality of mobile radio terminals located away from the image information input/output device through arbitrary distances respectively, a distance calculation module which calculates a distance of each of the mobile radio terminals in the plurality of mobile radio terminals from a send-output power value of the radio communication module which is carrying out communication with each of the mobile radio terminals of the a plurality of mobile radio terminals, a mobile radio terminal control module which manages identification information and user information for identify the mobile radio terminals in at least the plurality of mobile radio terminals, and distance and time calculated by the distance calculation module, an interval timer which allows the radio communication module to periodically carry out communication with the mobile radio terminals in the a plurality of mobile radio terminals, and allowing the distance calculation module to periodically calculate the distance, a user set memory which stores settings and operation screens customized by a plurality of users, a user judging module which detects that any of the plurality of users approached the image information input/output device based on the distance calculated by the distance calculation module, and which identifies a user who approached the image information input/output device based on identification information which identifies each of the mobile radio terminals of the plurality of mobile radio terminals managed by the mobile radio terminal control module, whenever communication with each of the mobile radio terminals of the plurality of mobile radio terminals is carried out by the radio communication module, and a display which reads and displays the setting and the operation screen customized by the user from the user set memory for switching to the setting and the operation screen customized by the user specified by the user judging module.

To achieve the above object, according to the present invention, the followings are provided.

(3) An image information input/output device according to (2), wherein when a plurality of users are specified by the user judging module and the switching of the setting and the operation screen customized by the user to be displayed can not be specified, the display displays a plurality of judged candidates on the screen, and if a user designates, the user setting can be switched.

To achieve the above object, according to the present invention, the followings are provided.

(4) A control method of an image information input/output device for executing reading input or printing output of image information comprising the steps of:

carrying out communication by varying a send-output power to a plurality of mobile radio terminals located away from the image information input/output device through arbitrary distances respectively, calculating a distance of each of the mobile radio terminals in the plurality of mobile radio terminals from a send-output power value of the radio communication module which is carrying out communication with each of the mobile radio terminals of the a plurality of mobile radio terminals, managing identification information and user information for identify the mobile radio terminals in at least the plurality of mobile radio terminals, and calculated distance and time, periodically carrying out communication with each of the mobile radio terminals of the plurality of mobile radio terminals and calculating the distance, detecting that any of the plurality of users approached the image information input/output device based on the calculated distance, and for identifying a user who approached the image information input/output device based on identification information which identifies each of the mobile radio terminals of the managed plurality of mobile radio terminals, whenever communication with each of the mobile radio terminals of the plurality of mobile radio terminals is carried out by the radio communication module.

To achieve the above object, according to the present invention, the followings are provided.

(5) A control method of an image information input/output device for executing reading input or printing output of image information comprising the steps of:

carrying out communication by varying a send-output power to a plurality of mobile radio terminals located away from the image information input/output device through arbitrary distances respectively, calculating a distance of each of the mobile radio terminals in the plurality of mobile radio terminals from a send-output power value of the radio communication module which is carrying out communication with each of the mobile radio terminals of the a plurality of mobile radio terminals, managing identification information and user information for identify the mobile radio terminals in at least the plurality of mobile radio terminals, and calculated distance and time, periodically carrying out communication with each of the mobile radio terminals of the plurality of mobile radio terminals and calculating the distance, previously storing settings and operation screens respectively customized by the plurality of users, detecting that any of the plurality of users approached the image information input/output device based on the calculated distance, and for identifying a user who approached the image information input/output device based on identification information which identifies each of the mobile radio terminals of the managed plurality of mobile radio terminals, whenever communication with each of the mobile radio terminals of the plurality of mobile radio terminals is carried out by the radio communication module, and reading and displaying the setting and the operation screen customized by the user for switching to the setting and the operation screen customized by the user specified by the user judging module.

To achieve the above object, according to the present invention, the followings are provided.

(6) A control method of an image information input/output device according to (5), wherein when a plurality of users are specified by the user judging module and the switching of the setting and the operation screen customized by the user to be displayed can not be specified, a plurality of judged candidates are displayed on the screen, and if a user designates, the user setting can be switched.

To achieve the above object, according to the present invention, the followings are provided.

(7) An image information input/output device for executing reading input or printing output of image information comprising:

a radio communication module capable of carrying out communication by varying a send-output power to a plurality of mobile radio terminals located away from the image information input/output device through arbitrary distances respectively, a distance calculation module which calculates a distance of each of the mobile radio terminals in the plurality of mobile radio terminals from a send-output power value of the radio communication module which is carrying out communication with each of the mobile radio terminals of the a plurality of mobile radio terminals, a mobile radio terminal control module which manages identification information and user information for identify the mobile radio terminals in at least the plurality of mobile radio terminals, and distance and time calculated by the distance calculation module, an interval timer which allows the radio communication module to periodically carry out communication with the mobile radio terminals in the a plurality of mobile radio terminals, and allowing the distance calculation module to periodically calculate the distance, a client terminal control module which manages identification information and user specifying at least the client terminal device, a user judging module which detects that any of the plurality of users approached the image information input/output device based on the distance calculated by the distance calculation module, and which identifies a user who approached the image information input/output device based on identification information which identifies each of the mobile radio terminals of the plurality of mobile radio terminals managed by the mobile radio terminal control module, whenever communication with each of the mobile radio terminals of the plurality of mobile radio terminals is carried out by the radio communication module, and a control module which automatically starts the printing operation when a user specified by the user judging module requested the private printing.

To achieve the above object, according to the present invention, the followings are provided.

(8) A control method of an image information input/output device for executing reading input or printing output of image information comprising the steps of:

carrying out communication by varying a send-output power to a plurality of mobile radio terminals located away from the image information input/output device through arbitrary distances respectively, calculating a distance of each of the mobile radio terminals in the plurality of mobile radio terminals from a send-output power value of the radio communication module which is carrying out communication with each of the mobile radio terminals of the a plurality of mobile radio terminals, managing identification information and user information for identify the mobile radio terminals in at least the plurality of mobile radio terminals, and calculated distance and time, periodically carrying out communication with each of the mobile radio terminals of the plurality of mobile radio terminals and calculating the distance, managing identification information and user specifying at least the client terminal device, detecting that any of the plurality of users approached the image information input/output device based on the calculated distance, and for identifying a user who approached the image information input/output device based on identification information which identifies each of the mobile radio terminals of the managed plurality of mobile radio terminals, whenever communication with each of the mobile radio terminals of the plurality of mobile radio terminals is carried out by the radio communication module, and automatically starting the printing operation when a specified user requested the private printing.

To achieve the above object, according to the present invention, the followings are provided.

(9) An image information input/output device for executing reading input or printing output of image information comprising:

a radio communication module capable of carrying out communication by varying a send-output power to a plurality of mobile radio terminals located away from the image information input/output device through arbitrary distances respectively, a distance calculation module which calculates a distance of each of the mobile radio terminals in the plurality of mobile radio terminals from a send-output power value of the radio communication module which is carrying out communication with each of the mobile radio terminals of the a plurality of mobile radio terminals, a mobile radio terminal control module which manages identification information and user information for identify the mobile radio terminals in at least the plurality of mobile radio terminals, and distance and time calculated by the distance calculation module, an interval timer which allows the radio communication module to periodically carry out communication with the mobile radio terminals in the a plurality of mobile radio terminals, and allowing the distance calculation module to periodically calculate the distance, a client terminal control module which manages identification information and user specifying each of client terminal devices in at least a plurality of client terminal devices, a notifying module which informs a client terminal device of a fact that a print job requested by that client terminal device in the plurality of client terminal devices has been completed, and which periodically sends a receipt requesting notification until a print original draft is received, a user judging module which detects that any of the plurality of users approached the image information input/output device based on the distance calculated by the distance calculation module, and which judges that a user who is sending a receipt requesting notification approached the image information input/output device based on identification information which identifies each of the mobile radio terminals of the plurality of mobile radio terminals managed by the mobile radio terminal control module, whenever communication with each of the mobile radio terminals of the plurality of mobile radio terminals is carried out by the radio communication by the interval timer, and a control module which detects that a distance from a user who is sending the receipt requesting notification judged by the user judging module became shortest, and judges that the user received the print original draft and completes the receipt requesting notification.

To achieve the above object, according to the present invention, the followings are provided.

(10) A control method of an image information input/output device for executing reading input or printing output of image information comprising the steps of:

carrying out communication by varying a send-output power to a plurality of mobile radio terminals located away from the image information input/output device through arbitrary distances respectively, calculating a distance of each of the mobile radio terminals in the plurality of mobile radio terminals from a send-output power value of the radio communication module which is carrying out communication with each of the mobile radio terminals of the a plurality of mobile radio terminals, managing identification information and user information for identify the mobile radio terminals in at least the plurality of mobile radio terminals, and calculated distance and time, periodically carrying out communication with each of the mobile radio terminals of the plurality of mobile radio terminals and calculating the distance, managing identification information and user which specify each of client terminal devices in at least a plurality of client terminal devices, informing a client terminal device of a fact that a print job requested from that client terminal device in the plurality of client terminal devices, and periodically sending a receipt requesting notice until a print original draft is received, detecting that any of the plurality of users approached the image information input/output device based on the calculated distance, and for judging that a user who is sending the receipt requesting notice approached the image information input/output device based on identification information which identifies each of the mobile radio terminals of the managed plurality of mobile radio terminals, whenever communication with each of the mobile radio terminals of the plurality of mobile radio terminals is carried out by the radio communication module, and detecting that a distance from a user who is sending the receipt requesting notification judged by the user judging module became shortest, and judging that the user received the print original draft and completing the receipt requesting notification.

To achieve the above object, according to the present invention, the followings are provided.

(11) An input/output device controlling system using a short distance radio communication as notifying means, comprising:

a capable-of-notifying client terminal finding module which finds a client terminal that can notify a communication target device when the communication target device does not exist in a communication-possible range with a device to be notified, and an indirect-notification module which transmits a notification destination, a notification method, notification contents and the like to a client terminal device which can be notified and which was found out by the capable-of-notifying client terminal finding module, thereby making it possible to send the notification to the communication target device.

To achieve the above object, according to the present invention, the followings are provided.

(12) An input/output device controlling system according to (11), further comprising a communication processing restarting module in which when the communication target device does not exist in the communication-possible range of all of the client terminals, the communication processing is placed on hold, and when it is detected that the communication target device exists within the communication-possible range, the communication processing is restarted.

To achieve the above object, according to the present invention, the followings are provided.

(13) An input/output device controlling system according to (12), wherein when an urgent degree of communication contents such as failure, error and the like is high, the notification is not placed on hold, and notification can be sent to a mobile telephone possessed by the user to be notified using public lines.

To achieve the above object, according to the present invention, the followings are provided.

(14) An input/output device controlling system according to (13), further comprising a detecting module which detects whether any procedure has been taken for the notified failure, error and the like when the urgent degree of the communication contents such as failure, error and the like is high, wherein after a predetermined time has been elapsed, if no procedure was not taken to the failure, error and the like, a communication range is widened to a requester who was not notified and exists in a processing request waiting table, whenever the notification is repeated, its range is widened.

To achieve the above object, according to the present invention, the followings are provided.

(15) A control method of an input/output device controlling system using a short distance radio communication as notifying means comprising the steps of:

finding out a client terminal which can notify a communication target device when the communication target device does not exist in a communication-possible range of a device to which the communication target device desires to notify, and transmitting a notification destination, a notification method, notification contents and the like of the communication target device to a client terminal device which can be notified and which was found out, thereby making it possible to send the notification to the communication target device.

To achieve the above object, according to the present invention, the followings are provided.

(16) A control method of an input/output device controlling system according to (15), further comprising restating the communication processing, when the communication target device does not exist in the communication-possible range of all of the client terminals, the communication processing is placed on hold, and when it is detected that the communication target device exists within the communication-possible range.

To achieve the above object, according to the present invention, the followings are provided.

(17) A control method of an input/output device controlling system according to (16), further comprising capable of carrying out notification by using a mobile telephone possessed by the user to be notified using public lines, when an urgent degree of communication contents such as failure, error and the like is high, the notification is not placed on hold.

To achieve the above object, according to the present invention, the followings are provided.

(18) A control method of an input/output device controlling system according to (17), further comprising detecting whether any procedure has been taken for the notified failure, error and the like when the urgent degree of the communication contents such as failure, error and the like is high, winding a communication range to a requester who was not notified and exists in a processing request waiting table, whenever the notification is repeated, its range is widened, after a predetermined time has been elapsed, if no procedure was not taken to the failure, error and the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

FIG. 2 is a block diagram for explaining a schematic structure of a control system in the digital compound device applied as an image forming device according to a first embodiment of the present invention;

FIG. 5 shows a table format for registering in the database of the mobile telephone control (radio terminal control) module;

FIG. 6 shows a table format for registering information for identifying a user in the database of a client terminal control module;

FIG. 11 is a view for explaining a print-completion notification processing in which a distance at the time of print reception and a distance after completion of print are used as parameters to form a table, and flows of a notice destination, a notification method and notification control are automatically changed in accordance with the table;

FIG. 12 is a view for explaining failure/error notifying processing in which a distance at the time of print reception and a distance after completion of print are used as parameters to form a table, and flows of a notice destination, a notification method and notification control are automatically changed in accordance with the table; and FIG. 13 is a view showing a format of a print request waiting table in which users who notify are entries when trial of notification is spread through short distance radio communication when indirect notification is not possible.

DETAILED DESCRIPTION OF THE INVENTION

Figure 1:
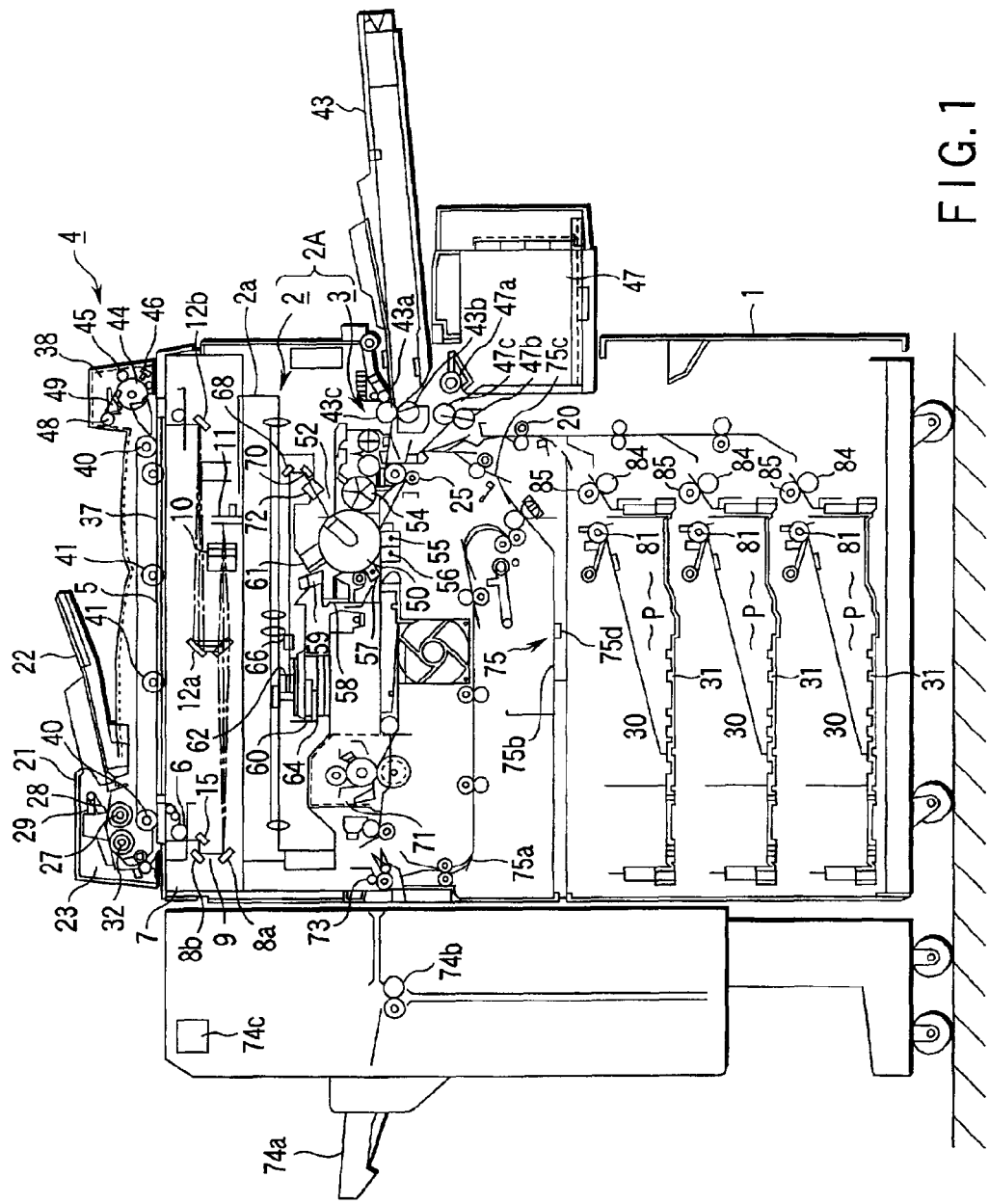
FIG. 1 is a schematic view showing an entire structure of a digital compound device that is one kind of a compound image forming device applied as an image forming device of the present invention.

Reference will now be made in detail to the presently preferred embodiments of the invention as illustrated in the accompanying drawings, in which like reference numerals designate like or corresponding parts.
(First Embodiment)

A digital compound device that is one of the images forming devices to which the present invention is applied will be explained as a first embodiment with reference to the drawings.

FIG. 1 is a schematic view showing an entire structure of a digital copier (which is also called an image forming device, a digital compound device or an image information input/output device as required) 1 that is one kind of a compound image forming device applied as an image forming device of the present invention.

The digital copier 1 in the first embodiment includes a scanner 2 and a printer (laser engine) 3, and is provided at its upper portion with an automatic original draft feeder (ADF) 4.

The automatic original draft feeder 4 has a cover body 21 as a case, a rear end edge of the cover body 21 is mounted to a rear edge of an upper surface of an apparatus body through a hinge device such that the cover body 21 can open and close. The entire automatic original draft feeder 4 can be turned and displaced if necessary so that an upper portion of an original draft stage 5 can be opened.

An original draft feeding stage 22 capable of collectively holding a plurality of original drafts is provided on a slightly right portion of an upper surface of the cover body 21.

Feeding means 23 for taking out the original draft one sheet by one sheet and feeding the same to one end side (left end side in the drawing) of the original draft stage 5 is provided on one end side of the apparatus.

In the feeding means 23, there are disposed a pickup roller 27 for taking out the original drafts, a weight plate 28 for pushing the original drafts against the pickup roller 27, an empty sensor 29 as an original draft detection sensor for detecting a set state of the original drafts to the original draft feeding stage 22, and the like.

A paper feed roller 32 is disposed in an original draft taking out direction of the pickup roller 27 so that the original drafts can be fed one sheet by one sheet reliably.

An original draft transfer belt 37 for covering the original draft stage 5 is stretched on the upper surface of the original draft stage 5.

The original draft transfer belt 37 comprises a wide endless belt having white surface wound around a pair of belt rollers 40 and 40, and can run in normal and reverse directions by a belt driving mechanism (not shown).

A plurality of belt-pressing rollers 41 . . . for pressing the belt surface against the original draft stage 5 and a set switch (not shown) for detecting the open/close state of the automatic original draft feeder are provided on a back surface side of an inner periphery of the original draft transfer belt 37.

The original draft fed by the feeding means 23 is transferred from one end side (left end side) to the other end side (right end side) of the original draft stage 5 by the feeding means 23.

Paper-ejecting means 38 provided on a right side portion of the apparatus is provided with a transfer roller 44, a pinch roller 45 for pressing the original draft against the transfer roller 44, a paper-ejection sensor 46 as original draft detecting means for detecting a rear end of an original draft sent in the paper-ejecting direction, and the like.

A paper-ejection roller 48 is disposed downstream from the original draft ejecting path.

The original draft ejecting path is provided with a gate 49 for turning over the original draft and guiding the same to the original draft stage 5, so that the original draft can be copied on both two sides of a sheet of paper.

The scanner 2 as reading means comprises an exposure lamp 6 as a light source, a first carriage 7 on which a mirror 15 is disposed, a second carriage 9 on which mirrors 8a and 8b are disposed for bending optical path, a lens 10, a CCD sensor 11 for receiving reflection light, and an A/D converter (not shown) for converting an output of the CCD sensor 11, i.e., image data (information) from analogue data into digital data.

The first and second carriages 7 and 9 are connected to each other through a timing belt (not shown), and the second carriage 9 moves in the same direction as the first carriage 7 at ½ speed thereof.

With this arrangement, the first and second carriages 7 and 9 can scan such that a length of optical path to the lens 10 is constant.

The lens 10 moves to a direction of optical axis when magnification is changed while the focus distance is fixed.

In the CCD sensor 11, one pixel of the original draft corresponds to one element of the CCD sensor.

An output of the CCD sensor 11 is output to the A/D converter.

The first and second carriages 7 and 9 as well as mirrors 12a and 12b are moved by stepping motors (not shown).

The first and second carriages 7 and 9 are moved in accordance with motion of the timing belt (not shown) wound around between a drive pulley (not shown) connected to a rotation shaft of the stepping motor and an idle pulley (not shown).

A spiral shaft (not shown) of the lens 10 is rotated by the corresponding stepping motor (not shown), and the lens 10 is moved in the direction of the optical axis by this spiral motion.

A collimate lens 62, a polygon mirror 64, a lens 66, reflecting mirrors 68 and 70 and a lens 72 are disposed in correspondence with a laser diode 60 constituting a laser optical system 2a, so that a photosensitive drum 50 is radiated with laser light from an exposure apparatus 52.

An image forming module 2A, i.e., a printer 3 as the image forming means comprises a combination of the laser optical system and an electrophotographic system capable of forming an image on a sheet of transfer paper for example.

That is, the printer 3 has the photosensitive drum 50 as image carrier pivotally supported at a substantially central portion in the image forming device.

The exposure apparatus 52, a developing apparatus 54, a transfer charger 55, a peeling charger 56, pre-cleaning diselectrification charger 57, a cleaner 58, a diselectrification lamp 59 and an electrification charger 61 are disposed in this order around the photosensitive drum 50.

The photosensitive drum 50 becomes charged uniformly by the electrification charger 61.

With this, if laser light is output from the scanner 2, an image of the original draft is formed on the photosensitive drum 50, and an electrostatic latent image is formed.

The electrostatic latent image formed on the photosensitive drum 50 is developed by the developing apparatus 54, and the image is transferred onto a sheet of copy paper (medium on which image is formed) P fed from a paper feed cassette 30 as later-described paper feeding means through a paper feed roller 20 and an aligning roller 25.

The sheet of copy paper (copy sheet, hereinafter) after the image was transferred by the transfer charger 55 is peeled by AC corona discharge of the peeling charger 56, and transferred to a fusing device 71 through the transfer belt.

The copy sheet P on which the image was fused by the fusing device 71 is ejected to a unit 74 having an output tray 74a by a pair of paper-ejecting rollers 73.

The unit 74 has a pair of rollers 74b for facing down the copy sheet P ejected from the pair of paper-ejecting rollers 73.

Further, the unit 74 is provided at its upper portion with a stapler 74c for stapling one copy by one copy at the time of staple sort mode.

On the other hand, developer remained on the photosensitive drum 50 after transfer and peeling of the developed image onto the copy sheet P is previously diselectrified by the pre-cleaning diselectrification charger 57 and then is cleaned by the cleaner 58, and potential on the photosensitive drum 50 is reduced to a predetermined level or lower by the diselectrification lamp 59, so that next copy operation can be carried out.

In the case of a two-sided copy in which both two sides of the copy sheet P are to be printed, the copy sheet P on which the developed image is fused by the fusing device 71 is transferred through a transfer path 75a and then, accumulated on the tray 75b.

The one-side copied copy sheet P accumulated on the tray 75b is transferred to the transfer charger 55 through a transfer path 75c, and the developed image is transferred to the other side thereof which has not yet copied.

A light-reflection type paper sensor 75d is provided on a lower portion of the tray 75b, and this sensor detects whether sheets of paper are stacked on the tray 75b.

An automatic two-sided device (ADD) 75 as an automatic two-sided reversing mechanism is constituted by the transfer path 75a, the tray 75b, the transfer path 75c and the paper sensor 75d.

In the drawing, a reference number 30 represents a plurality of paper feed cassettes as paper feeding means which are detachably attached vertically from a front side of the apparatus body 1.

Each of the paper feed cassettes 30 comprises a cassette case 31 which is a case in which the copy sheets P are accommodated.

A taking-out end of the cassette case 31 is inclined into a paper taking-out direction.

The copy sheets P accommodated in the cassette case 31 of the paper feed cassette 30 are picked up and taken out from the uppermost layer by a pickup roller 81.

The copy sheets P taken out by the pickup roller 81 and sent to the taking-out end are separated one sheet by one sheet by a paper separating section comprising a paper feed roller 84 and a separating roller (or separating pad) 85 disposed at inside upper portions of the taking-out end of the cassette case 31, and are transferred toward the printer 3.

A paper feed cassette 43 detachably mounted to the right side of the apparatus body 1, and a large-capacity paper feed device (LCF) 47 is mounted to the right side of the apparatus body 1.

Copy sheets P accommodated in the paper feed cassette 43 are picked up and taken out from the uppermost layer by a pickup roller 43a.

The copy sheets P taken out by the pickup roller 43a and sent toward the taking-out end of the paper feed cassette 43 are separated one sheet by one sheet by a paper separating section comprising a paper feed roller 43b and a separating roller 43c disposed at inside upper portions of the taking-out end of the cassette case 43, and are transferred toward the printer 3.

Copy sheets P accommodated in the LCF 47 are picked up and taken out from the uppermost layer by a pickup roller 47a.

The copy sheets P taken out by the pickup roller 47a and sent toward the taking-out end of the LCF 47 are separated one sheet by one sheet by a paper separating section comprising a paper feed roller 47b and a separating roller 47c disposed at inside upper portions of the taking-out end of the LCF 47, and are transferred toward the printer 3.

That is, the digital copier 1 as the compound image forming device according to the present invention shown in FIG. 1 comprises the scanner 2 for reading the original draft and the image forming module 2A.

The scanner 2 optically scans the original draft taken by an ADF (automatic document feeder) 4 or the like using the exposure lamp 6 as the light source, the CCD sensor 11 is radiated with its reflection light, and the scanner 2 reads in the digital image signal through A/D conversion.

The image forming module 2A comprises the photosensitive drum 50, the laser optical system 2a, the LCF 47 as the paper feed tray, the printer 3 including the developing apparatus 54, the fusing device 5, the paper feed tray 74a.

A semiconductor laser in the laser optical system 2a becomes ON/OFF by an image signal read by the scanner 2, the laser light is reflected by the polygon mirror and scanned, and the electrostatic latent image is formed on the photosensitive drum 50.

The electrostatic latent image is developed by the developing device 3 and then, is transferred on the paper to be fed by the paper feed tray 47 and is fused by a fusing device 71.

In this manner, the paper image formed is ejected onto the paper feed tray 74a.

FIG. 2 is a block diagram for explaining a schematic structure of the control system in the digital compound device applied as the image forming device according to the first embodiment of the present invention.

As shown in FIG. 2, in the image forming device 1 a scanner 201 is for taking in image data.

A G3 modem 202 is for facsimile transmission and reception in a group 3 mode.

A printer 203 prints and outputs image data.

An image processing module 204 converts image data input by a scanner 201 or the G3 modem 202 into image data format capable of being output to the printer 203 or the G3 modem 202, and carries out various image data processing such as compression and extension processing of image data.

A network I/F 205 is connected to a LAN or the like and sends or receives data to and from PC terminals as later-described client terminals 200A, 200B, 200C . . . or other digital compound devices.

A public telephone line interface (I/F) 206 is a module for carrying out communication with mobile telephone (mobile radio terminal) through general telephone lines.

A short distance radio (sending and receiving) communication module 207 is for carrying out communication with mobile radio terminals 200a, 200b, 200c . . . possess by respective users existing within tens meters on the same floor in the same office where the image forming device body 1 is installed shown in FIG. 1 for example. Send-output through an antenna 207a is variable.

A distance calculation module 208 is for calculating a distance between the image forming device 1 and each of the mobile radio terminals 200a, 200b, 200c . . . based on a minimum send-output value at which communication with each of the mobile radio terminals 200a, 200b, 200c . . . possessed by the users who are subject of the communication by the short distance radio communication module 207 is established.

An interval timer 209 allows the distance calculation module 208 to periodically calculate a distance between the image forming device 1 and the mobile radio terminals 200a, 200b, 200c . . . based on the communication by the short distance radio communication module 207 and the send-output value at the time of this communication.

A mobile telephone (radio terminal)control module 210 manages information and the like which identify the users to be notified of the mobile radio terminals 200a, 200b, 200c . . . as database having a format shown in FIG. 5.

A client terminal control module 211 manages information which identifies users of the client terminals 200A, 200B, 200C . . . to be notified as a database having a format shown in FIG. 6.

A user set memory 212 stores structural data in which functions which are frequently used by the user are registered as shortcut, favorite screen quality is registered and a later-described control panel 217 is customized.

A user I/F (module) 213 displays a customized screen on a display 214 on the control panel 217, allocates keys, and guide with voice.

A user judging module 215 detects whether any of the plurality of users approached the image information input/output device 1 based on the distance calculated by the distance calculation module 208 whenever communication with each of the mobile radio terminals 200a, 200b, 200c . . . is carried out through the short distance radio communication module 207 by the interval timer 209, and is controlled by the mobile radio terminal control module 210 to identify the user who approached the image information input/output device 1 based on the identification information which specifies the mobile radio terminals 200a, 200b, 200c . . . .

A control module (CPU) 216 controls operations of the above-described various portions.

Figure 3:
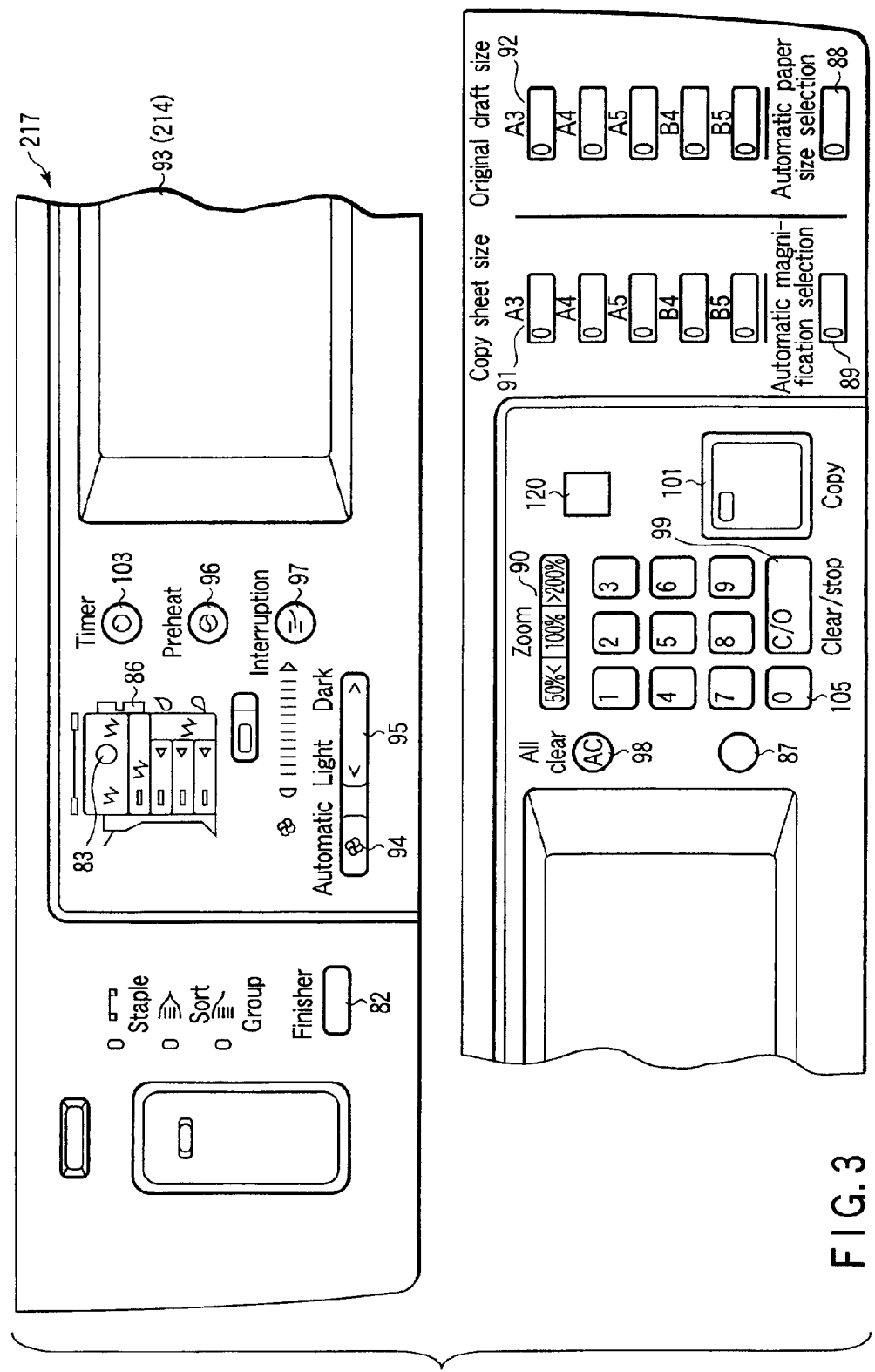
FIG. 3 is a view showing details of a control panel and a display section in FIG. 2.

FIG. 3 is a front view showing details of the control panel 217 and the display 214.

That is, FIG. 3 shows a structure of the control panel 217 as control means.

The control panel 217 comprises a finisher key 82, a state display 83, a cassette selection key 86 as selecting means of the paper feed cassette 30, a HELP key 87, an automatic paper selection key 88, an automatic magnification selection key 89, a zoom/100% key 90, an original draft size key 91, a paper size key 92, a message display 93, an automatic concentration key 94, a manual concentration key 95, a preheat key 96, an interruption key 97, an all clear key 98, a clear/stop key 99, a start key 101, a timer key 103, numeric keys 105 and a function switching key 120.

The finisher key 82 is used for selecting one of a sort mode, a group mode and a stable mode.

Various glyphs blink on the state display 83 to show a state of the copier.

When the selected cassette is not of a desired size, the cassette selection key 86 is pushed to select another cassette.

If the HELP key 87 is pushed as an operation guide key, message indicating the operation procedure is displayed, and if the HELP key 87 is pushed after the function was set, the set contents can be confirmed.

Normally, the automatic paper selection key 88 is in an automatic paper selection mode, and automatically detects a size of an original draft set on the original draft stage (glass) (not shown), and automatically selects the papers having the same size (only when the paper is copied with the equal magnification).

If the automatic magnification selection key 89 is pushed to select the automatic magnification selection mode and designate a desired paper size, the automatic magnification selection key 89 detects a size of the original draft set on the original draft stage (glass) 5, and automatically calculates the copy magnification.

If a "50%<" key of the zoom/100% key 90 is pushed, the copy magnification is reduced to 50% in increments of 1%.

If a ">200%" key of the zoom/100% key 90 is pushed, the copy magnification is increased to 200% in increments of 1%.

If a "100%" key of the zoom/100% key 90 is pushed, the copy magnification is returned to an equal magnification (100%).

The original draft size key 91 is used when the original draft size is set.

That is, if the paper size is selected and the original draft size is selected by the original draft size key 91, the copy magnification is automatically set.

The paper size key 92 is used for selecting the paper size.

The message display 93 displays a state of the digital copier 1, the operation procedure and various instructions to the user by characters and pictures as the display 214.

The message display 93 as the display 214 includes a touch panel there is and can set functions.

If an automatic concentration of the automatic concentration key 94 is selected, the digital copier 1 automatically detects density of the original draft and selects optimal copy concentration.

In the manual concentration, the manual concentration key 95 can select desired copy concentration.

The copy concentration can be brought into light by pushing a "light" key in five levels, and the copy concentration can be brought into dark by pushing a "dark" key in five levels.

If the preheat key 96 is pushed, the state is brought into preheat (power-saving) state, and all the display lamps go out.

After stopping, if a copy is made, this key is pushed again.

The interruption key 97 is used when interruption copy is to be made during continuous copy.

If the all clear key 98 is pushed, all the selected modes are cleared, and the state is returned to a standard state.

The clear/stop key 99 is used when the number of copies is changed or the copy operation is stopped.

The start key 101 is pushed when the copy is started.

If the timer key 103 is pushed, time when power of the digital copier 1 is to be ON or OFF is displayed on the display 214 (when a weekly timer is set).

The numeric keys 105 are used for setting the number of sheets of paper to be copied, and 1 to 999 sheets of copy paper can be set.

The function switching key 120 is a key for switching functions such as the facsimile function, the printer function and the like possessed by the compound digital copier.

That is, in the first embodiment, the image information input/output device which reading inputs or print output of the image information is subject.

The short distance radio communication module 207 can carry out communication for search by changing a plurality of mobile radio terminals 200a, 200b, 200c . . . located at arbitrary distances from the image information input/output device 1.

The distance calculation module 208 calculates distances between the mobile radio terminals 200a, 200b, 200c . . . in the plurality of mobile radio terminals from the send-output value of the short distance radio communication module 207 which are in communication with the mobile radio terminals 200a, 200b, 200c . . . in the plurality of mobile radio terminals.

The mobile radio terminal control module 210 manages at least the identification information, user information for identifying the mobile radio terminals 200a, 200b, 200c . . . in the plurality of mobile radio terminals, and the distance and time calculated by the distance calculation module 208.

The interval timer 209 allows the short distance radio communication module 207 to periodically carry out communication with the mobile radio terminals 200a, 200b, 200c . . . in the plurality of mobile radio terminals, and allows the distance calculation module 208 to periodically calculate the distance.

The user set memory 212 stores settings and operation screens which were customized by the plurality of users.

As described above, the user judging module 215 detects that any of the users approached the image forming input/output device 1 based on the distance calculated by the distance calculation module 208, and identifies the user who approached the image information input/output device 1 based on the identification information which identifies each of the mobile radio terminals 200a, 200b, 200c . . . in the plurality of mobile radio terminals whenever communication with the mobile radio terminals 200a, 200b, 200c . . . of the plurality of mobile radio terminals is carried out by the short distance radio communication module 207.

The display 214 reads out and displays the settings and operation screens customized by the identified user from the user set memory 22 for switching the settings and the operation screens customized by the user who was identified by the user judging module 215.

Figure 4:
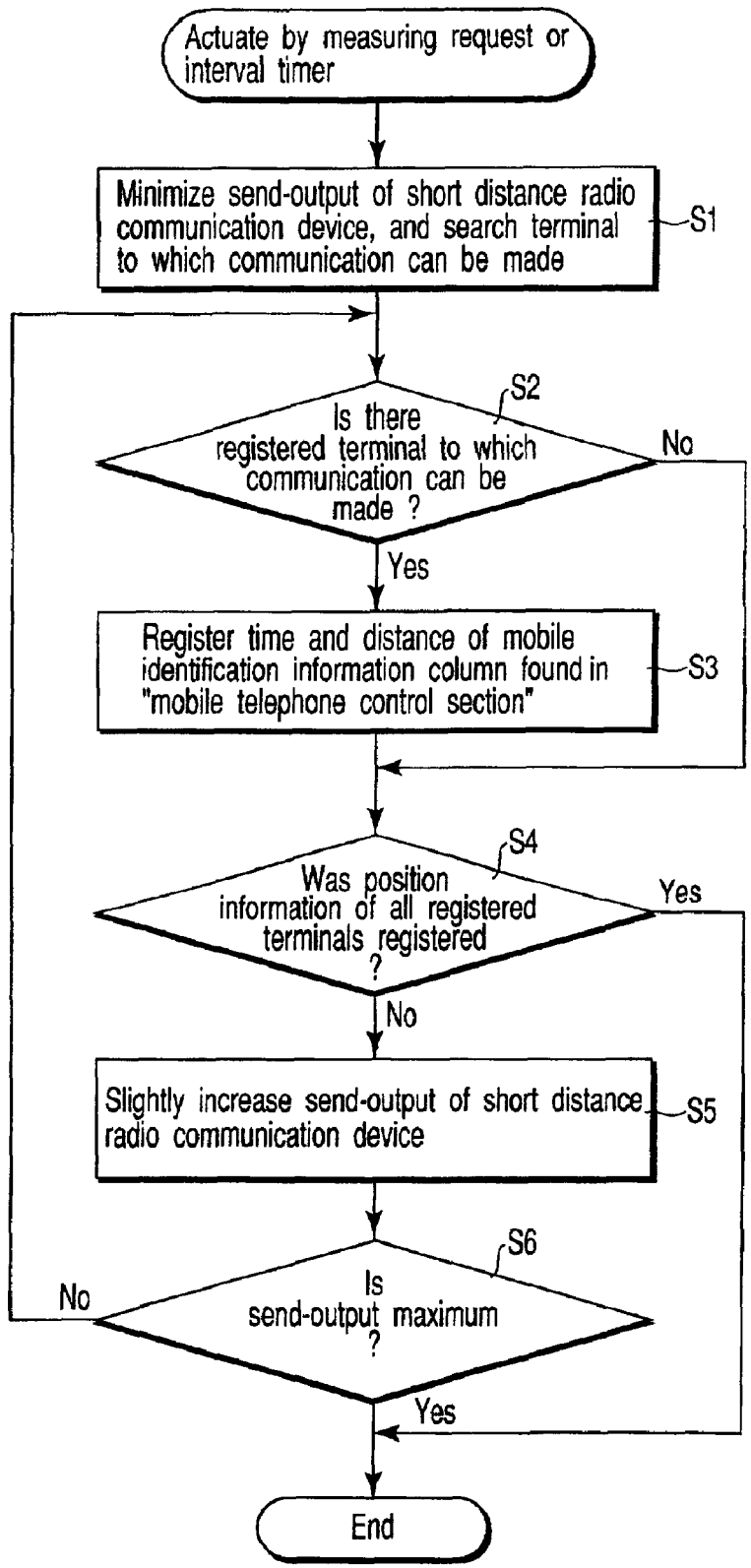
FIG. 4 is a flowchart for explaining a control method registering a distance between each of searched mobile radio terminals and an image information input/output device into a database of a mobile telephone control (radio terminal control) module.

FIG. 4 is a flowchart for explaining a control method in which when the image information input/output device 1 which executes reading input or print output of the image information such as the compound digital copier for example is subject, the image information input/output device 1 having the short distance radio communication system utilizes the short distance radio communication module 207 and finds out, through radio, each mobile radio terminals 200a, 200b, 200c . . . possessed by the plurality of users located at predetermined positions or arbitrary positions away from the predetermined positions, and the image information input/output device 1 calculates a distance between the image information input/output device 1 and each of the found mobile radio terminals 200a, 200b, 200c . . . , and the calculation result is registered in the database of the mobile telephone control module (radio terminal control module) 220.

First, outline of the control method will be explained. In this method, each of the mobile radio terminals 200a, 200b, 200c . . . is found out through radio, a distance between the image information input/output device 1 and each of the found mobile radio terminals 200a, 200b, 200c . . . , and the calculation result is registered in the database of the mobile telephone control module (radio terminal control module) 220.

The processing in which each of the mobile radio terminals 200a, 200b, 200c . . . is found out through radio, a distance between the image information input/output device 1 and each of the found mobile radio terminals 200a, 200b, 200c . . . , and the calculation result is registered in the database of the mobile telephone control module (radio terminal control module) 220 is periodically actuated by a request event of distant measurement or the interval timer 209.

When the mobile radio terminal is again found, the mobile radio terminal having old finding time is deleted from the database of the mobile telephone control module (radio terminal control module) 220, and the information is renewed to the latest one.

First, the send-output of the short distance radio communication module 217 is minimized, and any one of the mobile radio terminals 200a, 200b, 200c . . . existing near is searched (step S1).

Under this condition, if any of the mobile radio terminals 200a, 200b, 200c . . . is found, the distance, the finding time and identification information of the found mobile radio terminals 200a, 200b, 200c . . . of all of the found mobile radio terminals 200a, 200b, 200c . . . are registered in the database of the mobile telephone control module (radio terminal control module) 200 in a format shown in FIG. 5 (Steps S2, S3).

Next, the send-output of the short distance radio communication module 207 is slightly increased, and the mobile radio terminals 200a, 200b, 200c . . . are searched in the same manner.

At that time, the mobile radio terminals 200a, 200b, 200c . . . which have already been found are also detected at the same time, only identification information of the newly found mobile radio terminals 200a, 200b, 200c . . . except already found mobile radio terminals are registered in the database of the mobile telephone control module (radio terminal control module) 220 in the format shown in FIG. 5 (Steps S2, s3).

Subsequently, the mobile radio terminals 200a, 200b, 200c . . . are searched while increasing the send-output of the short distance radio communication module 207 little by little, and if mobile radio terminals are newly found, they are registered in the database of the mobile telephone control module (radio terminal control module) 220 in the format shown in FIG. 5, and this processing is repeated (steps S4, S5).

This processing is repeated until all of the mobile radio terminals 200a, 200b, 200c . . . registered in the mobile terminal control module 220 or the send-output of the short distance radio communication module 207 becomes maximum value (step S6).

Figure 7A:
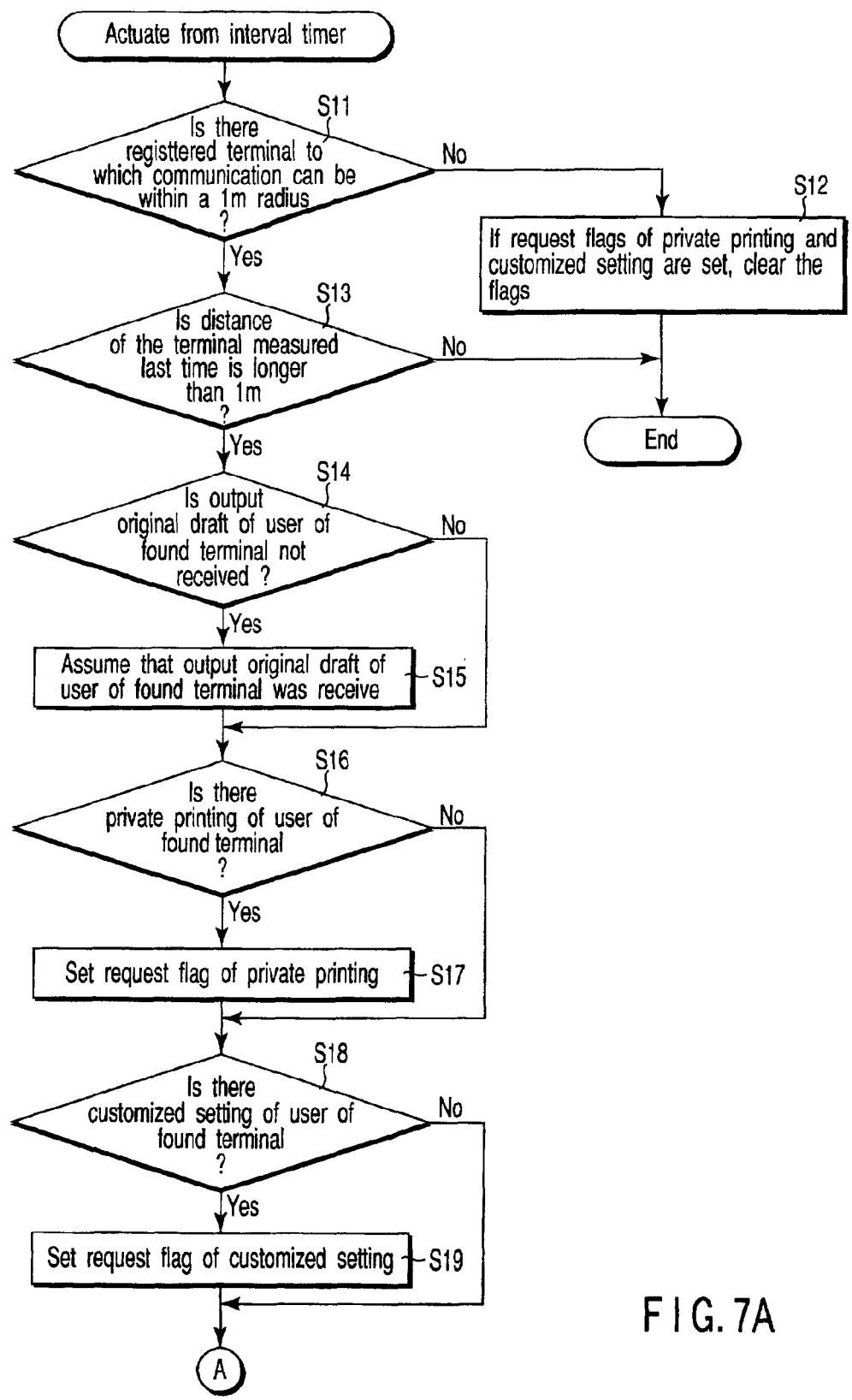
FIGS. 7A and 7B are flowcharts for explaining detection of a user approaching the image forming device, switch to a customize setting requested by the user, start of private printing processing, and reception-completion processing of a print output original draft.
Figure 7B:
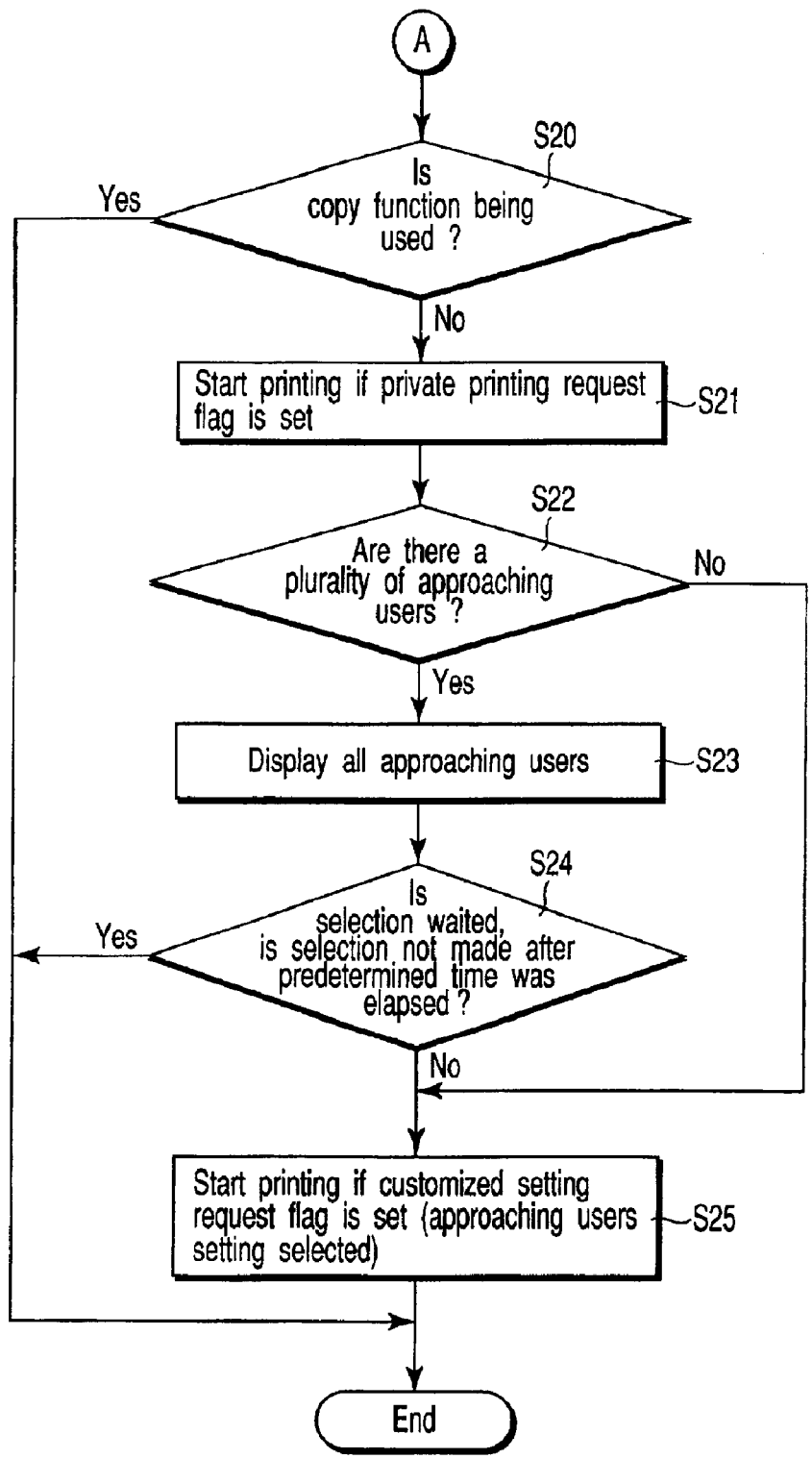

FIGS. 7A and 7B are flowcharts for explaining a procedure in which a fact that a user approached a physical position which is necessary to operate the image information device 1 or receive an original draft is detected by searching the mobile radio terminals 200a, 200b, 200c . . . , a setting is switched to a customized setting required by that user, the private printing processing is started, and reception of the print output original draft is completed.

In this case, a user approached a physical position which is necessary to operate the image information device 1 or receive an original draft is detected by the user judging module 215.

That is, as described above, the user judging module 215 detects any of the plurality of users approaches the image information input/output device 1 based on the distance calculated by the distance calculation module 208 whenever communication is carried out with the mobile radio terminals 200a, 200b, 200c . . . of the plurality of mobile radio terminals by the short distance radio communication module 207.

As described above, the user judging module 215 identifies the user who approached the image information input/output device 1 based on the identification information which identifies the mobile radio terminals 200a, 200b, 200c . . . of the plurality of mobile radio terminals managed by the mobile radio terminal control module 210.

Here, processing of switching the customized setting required by the user, starting of private printing processing, and completion of reception of the print output original draft are periodically actuated by the interval timer 209.

First, the user judging module 215 detects whether a user exists within a 1 m radius of the image forming device 1, and if no user exists with in the distance, that user switches the customized setting, and if a request flag of the private printing processing has been set, the request flag is cleared (steps S11, S12).

This is because that when the setting is switched to the customized setting and the user requesting the private printing processing approached the image forming device 1, the image forming device 1 is being used, the printing processing can not be carried out and then, when the printing processing can be carried out, it is detected whether that user exists within the 1 m radius, and if no user exists, that processing is canceled.

Next, after print processing of a certain user has been completed, the setting is switched to the customize setting, and it is checked whether a user who requests the private printing processing exists within the 1 m radius (steps S11, S13).

Next, it is judged whether the reception of the print output original draft of that user has been completed (step S14).

At that time, when original draft receipt requesting notice is carried out in another task, it is possible to detect that this user approached the image forming device 1 and to complete the communication processing (step S15).

Next, it is checked whether the approaching user requests the private printing, and if the private printing is requested, the request flag is set (steps S16, S17).

Next, it is checked whether the approaching user request the switch to the customize setting, and if switch to the customize setting is requested, its request flag is set (steps S18, S19).

Thereafter, it is checked whether the copy function is being used, and if not, the respective processing is started (step S20, S21).

Here, concerning the switch to the customize setting, it is checked whether there exists a plurality of approaching users, and if there exists the plurality of approaching users, a list thereof is displayed on the display 214, and the appropriate user is selected (steps S22, S23).

If the appropriate user is selected before a predetermined time is elapsed, i.e., if a request flag requesting the switch to the customize setting is set, the switch to the customize setting is started (steps S24, S25)

If the appropriate user is not selected even if the predetermined time has been elapsed, the switch is canceled.

As described above, according to the first embodiment of the present invention, operation of a user for setting his or her own customize environment can be omitted, and optimal operation method and screen quality of the user can obtained more easily.

(Second Embodiment)

As a second embodiment of the present invention, a case in which the invention is applied to a system comprising a digital compound device which is one of the image forming device and a client PC terminal disposed on the network will be explained.

Figure 8:
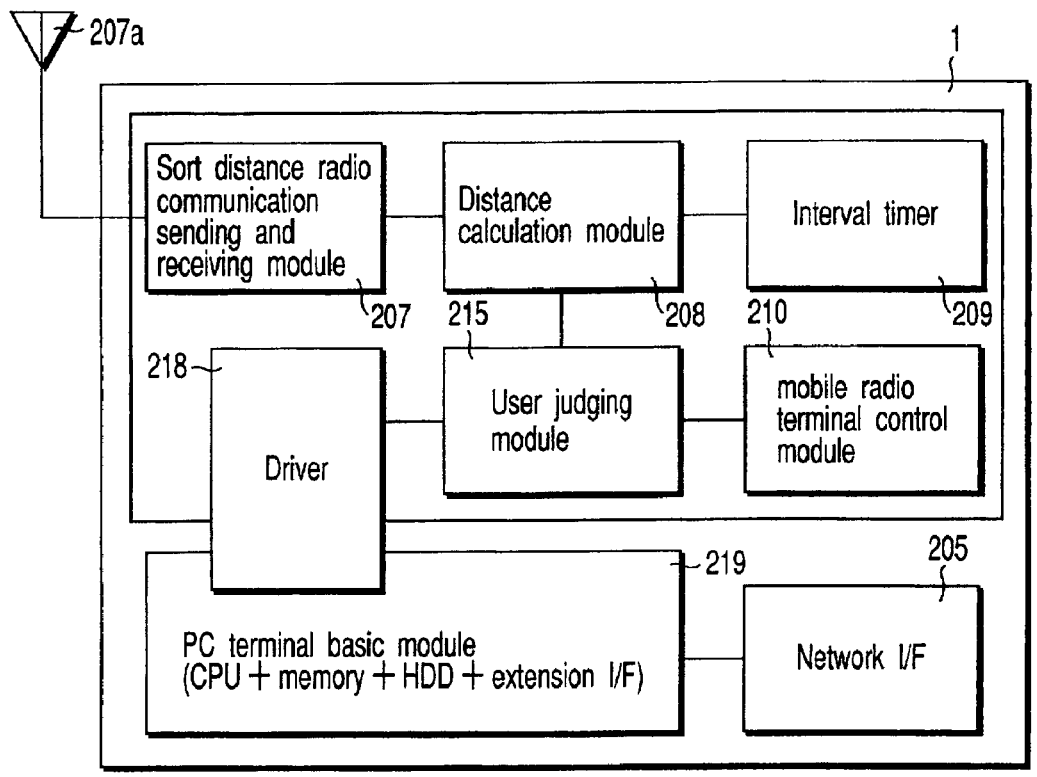
FIG. 8 is a block diagram for explaining a system constituted by a general PC terminal basic module comprising hardware and software driver module as schematic constituent members in a control system in a digital compound device applied as the image forming device realizing a short distance radio communication system according to a second embodiment of the present invention.
Figure 9:
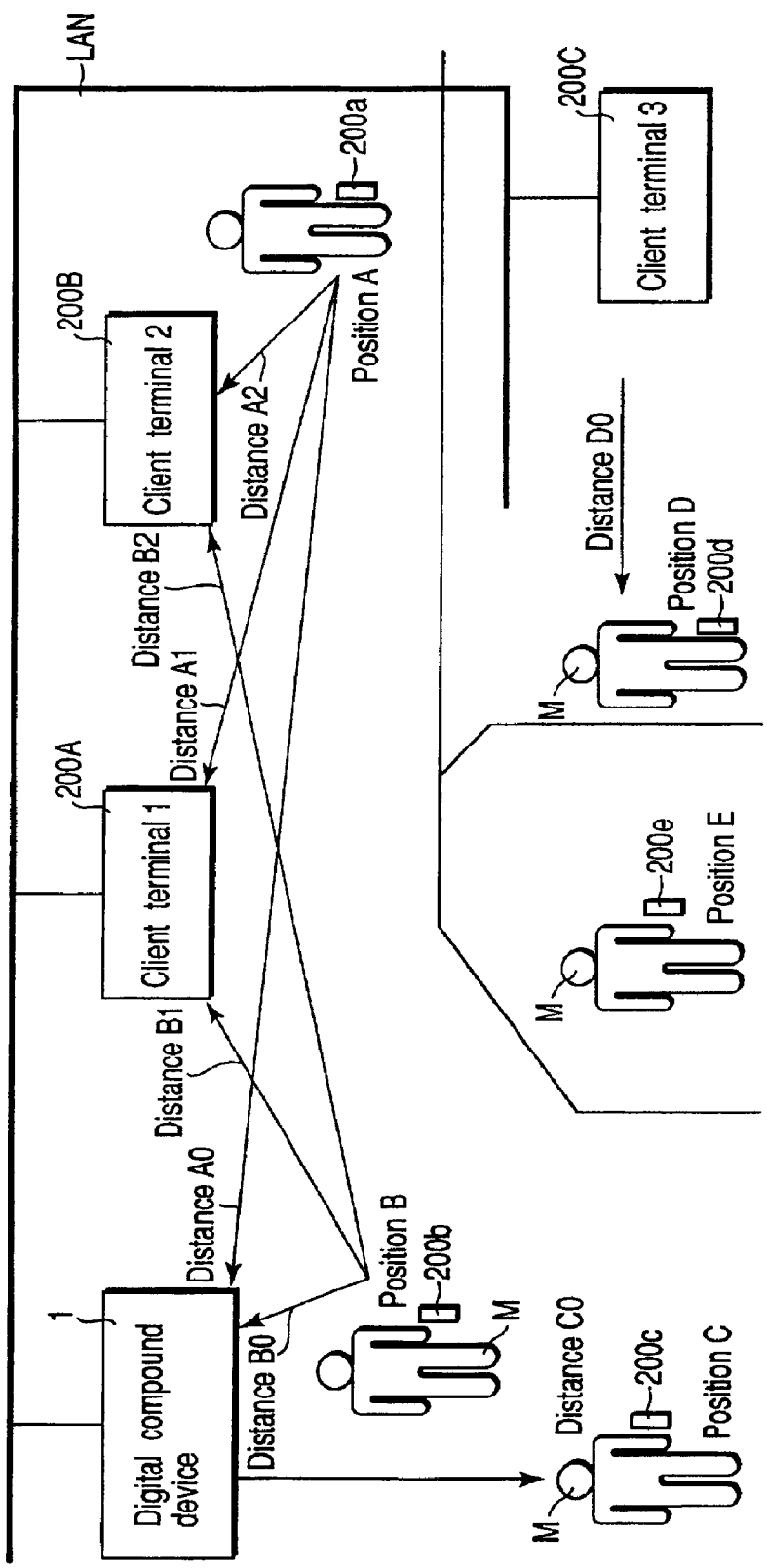
FIG. 9 is a view showing the system and external client terminals in FIG. 8 connected through a LAN in the second embodiment of the present invention.

In this second embodiment, first, the modules 207, 208, 209, 210 and 215 as hardware of the digital compound device 1 as explained in the first embodiment for realizing the mobile radio terminal and the short distance radio communication system as shown in FIG. 8, and a system constituted by a general PC terminal basic module 219 having a software driver module 218 which operates the modules 207, 208, 209, 210 and 215 and shares data with the mobile radio terminal control module 210 are connected to each other through LAN on the network as shown in FIG. 9.

In FIG. 9, client terminals 1, 2 (200A, 200B) are terminals possessed by a user M.

A client terminal 3 (200C) is not possessed by an individual, but is a terminal of the same group utilizing the digital compound device 1.

Here, each of the client terminals 1, 2 and 3 has the above-described short distance radio communication system.

Figure 10A:
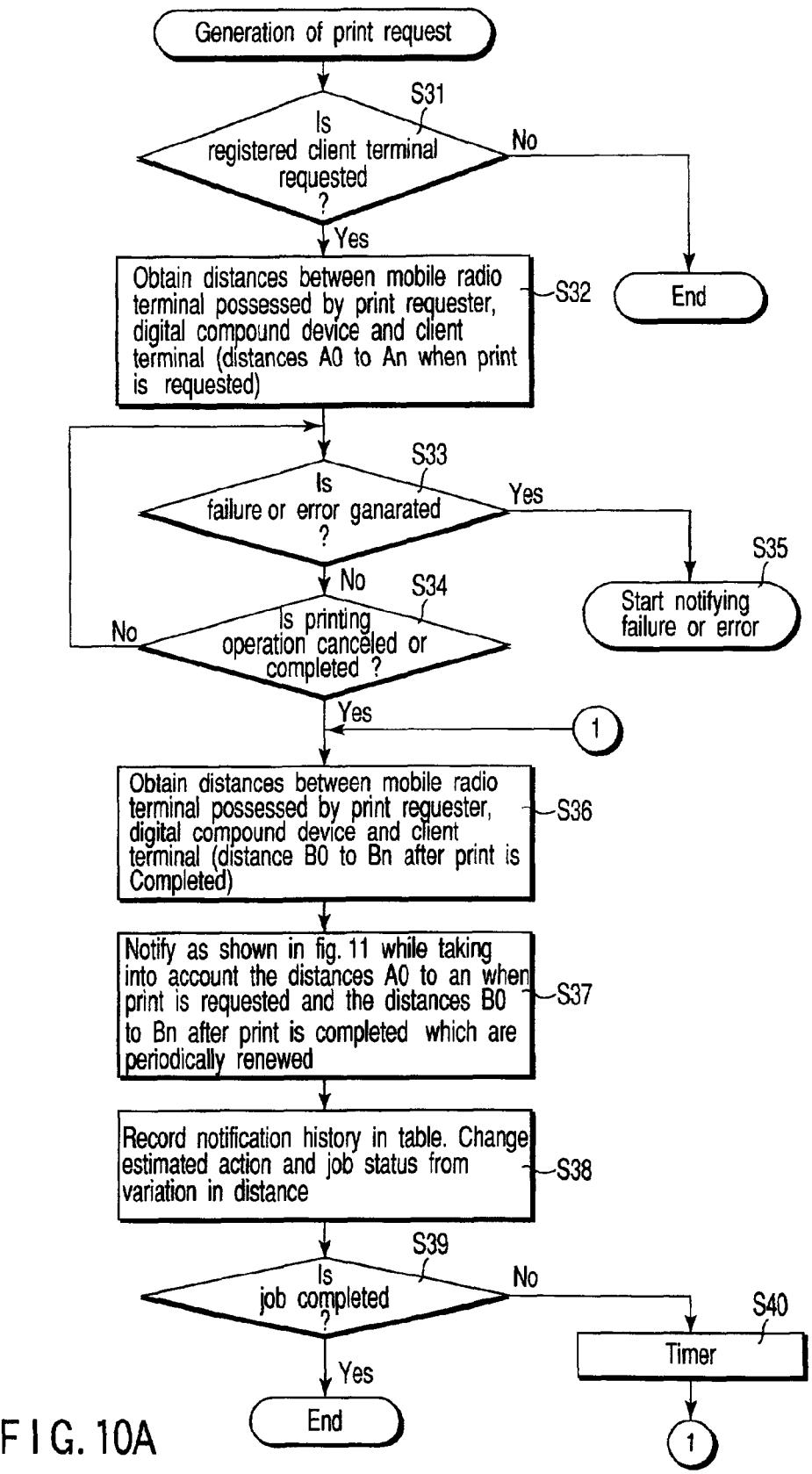
FIGS. 10A and 10B are flowcharts for explaining control mode including error processing in which the print processing is started by the image forming device on the system in the second embodiment of the present invention, and each user receives the output original draft while sending necessary notifications to the client terminals.
Figure 10B:
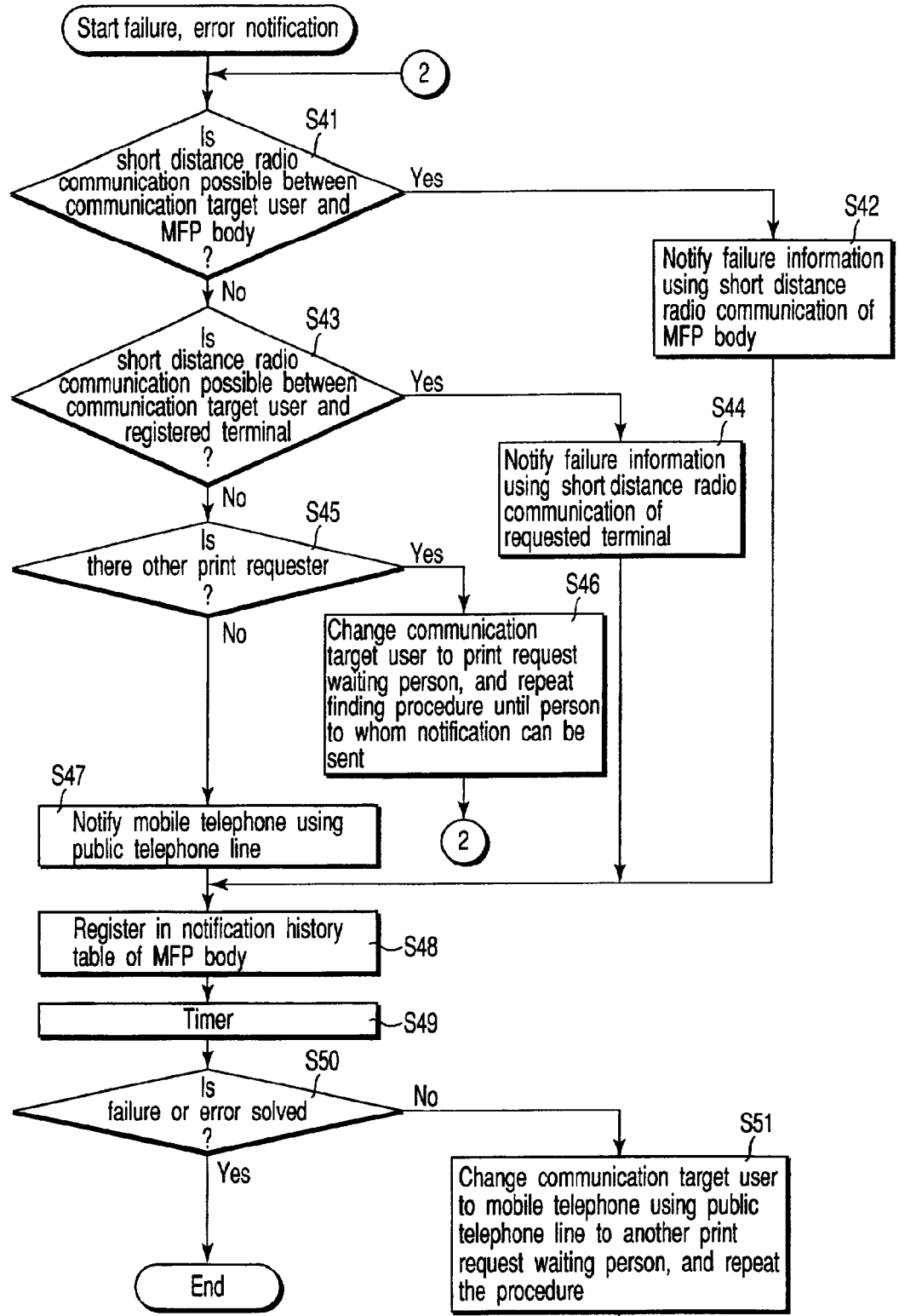

FIGS. 10A and 10B are flowcharts for explaining control mode including error processing in which the print processing is started by the image forming device 1, necessary notifications are sent to the client terminals 1, 2 and 3, and each user receives the output original draft.

First, as shown in FIG. 10A, if a print request is generated, and the digital compound device 1 is requested to carry out the print processing from the client terminal 2.

The digital compound device 1 receives the print request from the client terminal 2, and starts the print processing, but it is checked whether the request is from a registered client terminal. If the request is from a client terminal who was not registered, the processing is terminated without sending a notification to the client terminal (step S31).

Next, each distance between a mobile radio terminal possessed by the print requester, the digital compound device 1 and the client terminal (here, distance A0 to An when the print was requested) is obtained (step S32).

It is assumed that when a position of the user M at the time of the print request is a position A, a distance A0 from the position A to the digital compound device 1, a distance A1 to the client terminal 1, and a distance A2 to the client terminal 2 are obtained using the short distance radio communication system of each of the terminals 1 and 2.

At that time, a distance to the client terminal 3 is outside the sphere of communication because the user M does not exist in the communication range of the short distance radio communication system.

As described above, each the obtained distance information A0, A1 and A2 is managed as database commonly possessed by the mobile radio terminal control module 210 of the image forming device 1.

Next, printing processing is prepared, and the image forming device 1 actually starts the print output, but if the printing processing is normally completed or canceled, a print completion notification is sent, and if a failure or error such as jam or paper out is generated, a failure/error communication processing is carried out (steps S33, S35).

First, the print completion communication processing will be explained.

If a user exists at a position B after the printing processing was normally completed, a distance B0 from the position B to the digital compound device 1 and a distance B1 to the client terminal 1 are obtained by database commonly used by the mobile radio terminal control module 210 (steps S34, S36).

Similar to the case of print request, the client terminal 3 is outside the sphere of communication because the user M does not exist in the communication range of the short distance radio communication system.

The distances A0 to A2 when the print request was received and the distances B0 to B2 after the print was completed are used as parameters, and they are formed as a table as shown in FIG. 11 for example, and a flow of notification destination, notification method, and notification control are automatically changed in accordance with the table (step S37).

In this case, since the position B is smaller than a minimum value of a distance that can be detected by the short distance radio system of the digital compound device 1, notification is not sent, the original draft is received, and the job is handled as being completed (steps S38, 39).

If the user M sit in front of the position A, notification is sent to the display of the client terminal 2 on a pop-up screen, and if the position was C, a message is sent with incoming sound using the short distance radio terminal from the digital compound device 1.

If the position is D, since the position is outside the sphere of communication of the short distance radio communication system of the digital compound device 1, notification can not be sent directly, and data concerning the message contents and notification method is sent to the client terminal 3 through LAN, and the notification is sent to the user M from the short distance radio communication system of the client terminal 3.

If the position is E, no terminal can send the notification to the user M, the notification is placed on hold, and a terminal that detected the user M first sends the notification.

In this case, since the output original draft is not received, notification is sent after a predetermined time was elapsed, and this is repeated until the original draft is received by the user M.

Next, the failure/error communication processing will be explained with reference to FIG. 10B.

Like the print-completion notification, using the distances A0 to A2 when the print request was received and the distances B0 to B2 after the print was completed as parameters, a table is formed as shown in FIG. 12 for example, the a flow of notification destination, notification method, and notification control are automatically changed in accordance with the table.

Since the urgent degree of the failure/error notice is high, if notification can not be sent by the short distance radio communication system, the notification is not placed on hold, the range of user to be notified is widened or a mobile telephone that can notify to wider region. In this point, the failure/error notice is largely different.

First, it is checked whether notification can be sent to a mobile radio terminal of the user M by the short distance radio communication system of the digital compound device (MPF) 1 with reference to the shared database of the mobile radio terminal control module 210 (Step S41).

If notification can be sent to the mobile radio terminal of the user M from the digital compound device (MPF) 1, the notification is directly sent to the user M from the digital compound device (MPF) 1 (step S42).

If the notification can not be sent directly, it is checked whether the notification can be sent through the client (PC) terminal, and if yes, the communication contents are sent to the client PC terminal through the network, and the notification is sent indirectly (steps S43, S44).

If even indirectly notification is impossible, users to be notified as shown in FIG. 13 is spread from upper user registered in the print request waiting table, and the notification is tried by the short distance radio communication (steps S45, S46).

If even the above method is impossible, public telephone line is finally used to notify to the mobile telephone of the user by sound mail (step S47).

The failure/error notice is sent and the condition is not restored after a predetermined time, notification is sent to the user by the mobile telephone, it is spread to other print request waiting users (steps S48, S49, S50, S51).

As described above, according to the second embodiment of the present invention, appropriate communication method and means can automatically be selected in accordance with locality of a print requester, proceeding state and failure state can swiftly be grasped, availability of the image forming device can be enhanced.

Further, according to the second embodiment of the present invention, it is possible to reduce the possibility that the original draft is left on the tray because the print original draft is not received.

Therefore, as explained above, according to the present invention, it is possible to provide an image information input/output device in which a distance from a user who is moving is not neglected, and effective service is given to a user who approach beforehand, and to provide a control system for the image information input/output device using a mobile device in which a notification of failure when a failure is generated in the image information input/output device is efficiently sent so that the notification of failure which does not leave much to be desired for the user can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image information input/output device for executing reading input or printing output of image information comprising:

a radio communication module capable of carrying out communication by varying a send-output power to a plurality of mobile radio terminals located away from the image information input/output device through arbitrary distances respectively, a distance calculation module which calculates a distance of each of the mobile radio terminals in the plurality of mobile radio terminals from a send-output power value of the radio communication module which is carrying out communication with each of the mobile radio terminals of the plurality of mobile radio terminals, a mobile radio terminal control module which manages identification information and user information for identify the mobile radio terminals in at least the plurality of mobile radio terminals, and distance and time calculated by the distance calculation module, an interval timer which allows the radio communication module to periodically carry out communication with the mobile radio terminals in the plurality of mobile radio terminals, and allows the distance calculation module to periodically calculate the distance, and a user judging module which detects that any of a plurality of users approached the image information input/output device based on the distance calculated by the distance calculation module, and which identifies a user who approached the image information input/output device based on identification information which identifies each of the mobile radio terminals of the plurality of mobile radio terminals managed by the mobile radio terminal control module, whenever communication with each of the mobile radio terminals of the plurality of mobile radio terminals is carried out by the radio communication module by the interval timer.

2. An image information input/output device for executing reading input or printing output of image information comprising:

a radio communication module capable of carrying out communication by varying a send-output power to a plurality of mobile radio terminals located away from the image information input/output device through arbitrary distances respectively, a distance calculation module which calculates a distance of each of the mobile radio terminals in the plurality of mobile radio terminals from a send-output power value of the radio communication module which is carrying out communication with each of the mobile radio terminals of the plurality of mobile radio terminals, a mobile radio terminal control module which manages identification information and user information for identify the mobile radio terminals in at least the plurality of mobile radio terminals, and distance and time calculated by the distance calculation module, an interval timer which allows the radio communication module to periodically carry out communication with the mobile radio terminals in the plurality of mobile radio terminals, and allowing the distance calculation module to periodically calculate the distance, a user set memory which stores settings and operation screens customized by a plurality of users, a user judging module which detects that any of the plurality of users approached the image information input/output device based on the distance calculated by the distance calculation module, and which identifies a user who approached the image information input/output device based on identification information which identifies each of the mobile radio terminals of the plurality of mobile radio terminals managed by the mobile radio terminal control module, whenever communication with each of the mobile radio terminals of the plurality of mobile radio terminals is carried out by the radio communication module, and a display which reads and displays the setting and the operation screen customized by the user from the user set memory for switching to the setting and the operation screen customized by the user specified by the user judging module.

3. An image information input/output device according to claim 2, wherein when the plurality of users are specified by the user judging module and the switching of the setting and the operation screen customized by the user to be displayed can not be specified, the display displays a plurality of judged candidates on the screen, and if a user designates, the user setting can be switched.

4. A control method of an image information input/output device for executing reading input or printing output of image information comprising the steps of:

carrying out communication by varying a send-output power to a plurality of mobile radio terminals located away from the image information input/output device through arbitrary distances respectively, calculating a distance of each of the mobile radio terminals in the plurality of mobile radio terminals from a send-output power value of the radio communication module which is carrying out communication with each of the mobile radio terminals of the plurality of mobile radio terminals, managing identification information and user information for identify the mobile radio terminals in at least the plurality of mobile radio terminals, and calculated distance and time, periodically carrying out communication with each of the mobile radio terminals of the plurality of mobile radio terminals and calculating the distance, detecting that any of a plurality of users approached the image information input/output device based on the calculated distance, and for identifying a user who approached the image information input/output device based on identification information which identifies each of the mobile radio terminals of the managed plurality of mobile radio terminals, whenever communication with each of the mobile radio terminals of the plurality of mobile radio terminals is carried out by the radio communication module.

5. A control method of an image information input/output device for executing reading input or printing output of image information comprising the steps of:
- carrying out communication by varying a send-output power to a plurality of mobile radio terminals located away from the image information input/output device through arbitrary distances respectively,
- calculating a distance of each of the mobile radio terminals in the plurality of mobile radio terminals from a send-output power value of the radio communication module which is carrying out communication with each of the mobile radio terminals of the plurality of mobile radio terminals,
- managing identification information and user information for identify the mobile radio terminals in at least the plurality of mobile radio terminals, and calculated distance and time,
- periodically carrying out communication with each of the mobile radio terminals of the plurality of mobile radio terminals and calculating the distance,
- previously storing settings and operation screens respectively customized by a plurality of users,
- detecting that any of the plurality of users approached the image information input/output device based on the calculated distance, and for identifying a user who approached the image information input/output device based on identification information which identifies each of the mobile radio terminals of the managed plurality of mobile radio terminals, whenever communication with each of the mobile radio terminals of the plurality of mobile radio terminals is carried out by the radio communication module, and
- reading and displaying the setting and the operation screen customized by the user for switching to the setting and the operation screen customized by the user specified by the user judging module.

6. A control method of an image information input/output device according to claim 5, wherein when the plurality of users are specified by the user judging module and the switching of the setting and the operation screen customized by the user to be displayed can not be specified, a plurality of judged candidates are displayed on the screen, and if a user designates, the user setting can be switched.

7. An image information input/output device for executing reading input or printing output of image information comprising:
- a radio communication module capable of carrying out communication by varying a send-output power to a plurality of mobile radio terminals located away from the image information input/output device through arbitrary distances respectively,
- a distance calculation module which calculates a distance of each of the mobile radio terminals in the plurality of mobile radio terminals from a send-output power value of the radio communication module which is carrying out communication with each of the mobile radio terminals of the plurality of mobile radio terminals,
- a mobile radio terminal control module which manages identification information and user information for identify the mobile radio terminals in at least the plurality of mobile radio terminals, and distance and time calculated by the distance calculation module,
- an interval timer which allows the radio communication module to periodically carry out communication with the mobile radio terminals in the plurality of mobile radio terminals, and allowing the distance calculation module to periodically calculate the distance,
- a client terminal control module which manages identification information and user specifying at least the client terminal device,
- a user judging module which detects that any of the plurality of users approached the image information input/output device based on the distance calculated by the distance calculation module, and which identifies a user who approached the image information input/output device based on identification information which identifies each of the mobile radio terminals of the plurality of mobile radio terminals managed by the mobile radio terminal control module, whenever communication with each of the mobile radio terminals of the plurality of mobile radio terminals is carried out by the radio communication module, and
- a control module which automatically starts the printing operation when the user specified by the user judging module requested the private printing.

8. A control method of an image information input/output device for executing reading input or printing output of image information comprising the steps of:
- carrying out communication by varying a send-output power to a plurality of mobile radio terminals located away from the image information input/output device through arbitrary distances respectively,
- calculating a distance of each of the mobile radio terminals in the plurality of mobile radio terminals from a send-output power value of the radio communication module which is carrying out communication with each of the mobile radio terminals of the plurality of mobile radio terminals,
- managing identification information and user information for identify the mobile radio terminals in at least the plurality of mobile radio terminals, and calculated distance and time,
- periodically carrying out communication with each of the mobile radio terminals of the plurality of mobile radio terminals and calculating the distance,
- managing identification information and user specifying at least the client terminal device,
- detecting that any of a plurality of users approached the image information input/output device based on the calculated distance, and for identifying a user who approached the image information input/output device based on identification information which identifies each of the mobile radio terminals of the managed plurality of mobile radio terminals, whenever communication with each of the mobile radio terminals of the plurality of mobile radio terminals is carried out by the radio communication module, and
- automatically starting the printing operation when the specified user requested the private printing.

9. An image information input/output device for executing reading input or printing output of image information comprising:
- a radio communication module capable of carrying out communication by varying a send-output power to a plurality of mobile radio terminals located away from the image information input/output device through arbitrary distances respectively,
- a distance calculation module which calculates a distance of each of the mobile radio terminals in the plurality of mobile radio terminals from a send-output power value of the radio communication module which is carrying out communication with each of the mobile radio terminals of the plurality of mobile radio terminals, a mobile radio terminal control module which manages identification information and user information for identify the mobile radio terminals in at least the plurality of mobile radio terminals, and distance and time calculated by the distance calculation module, an interval timer which allows the radio communication module to periodically carry out communication with the mobile radio terminals in the plurality of mobile radio terminals, and allowing the distance calculation module to periodically calculate the distance, a client terminal control module which manages identification information and user specifying each of client terminal devices in at least the plurality of client terminal devices, a notifying module which informs a client terminal device of a fact that a print job requested by that client terminal device in the plurality of client terminal devices has been completed, and which periodically sends a receipt requesting notification until a print original draft is received, a user judging module which detects that any of the plurality of users approached the image information input/output device based on the distance calculated by the distance calculation module, and which judges that a user who is sending a receipt requesting notification approached the image information input/output device based on identification information which identifies each of the mobile radio terminals of the plurality of mobile radio terminals managed by the mobile radio terminal control module, whenever communication with each of the mobile radio terminals of the plurality of mobile radio terminals is carried out by the radio communication by the interval timer, and a control module which detects that a distance from the user who is sending the receipt requesting notification judged by the user judging module became shortest, and judges that the user received the print original draft and completes the receipt requesting notification.

10. A control method of an image information input/output device for executing reading input or printing output of image information comprising the steps of:

carrying out communication by varying a send-output power to a plurality of mobile radio terminals located away from the image information input/output device through arbitrary distances respectively, calculating a distance of each of the mobile radio terminals in the plurality of mobile radio terminals from a send-output power value of the radio communication module which is carrying out communication with each of the mobile radio terminals of the plurality of mobile radio terminals, managing identification information and user information for identify the mobile radio terminals in at least the plurality of mobile radio terminals, and calculated distance and time, periodically carrying out communication with each of the mobile radio terminals of the plurality of mobile radio terminals and calculating the distance, managing identification information and user which specify each of client terminal devices in at least the plurality of client terminal devices, informing a client terminal device of a fact that a print job requested from that client terminal device in the plurality of client terminal devices, and periodically sending a receipt requesting notice until a print original draft is received, detecting that any of a plurality of users approached the image information input/output device based on the calculated distance, and for judging that a user who is sending the receipt requesting notice approached the image information input/output device based on identification information which identifies each of the mobile radio terminals of the managed plurality of mobile radio terminals, whenever communication with each of the mobile radio terminals of the plurality of mobile radio terminals is carried out by the radio communication module, and detecting that a distance from the user who is sending the receipt requesting notification judged by the user judging module became shortest, and judging that the user received the print original draft and completing the receipt requesting notification.

* * * * *